C. C. HILL.
Machine for Cutting Escutcheons.
No. 210,200. Patented Nov. 26, 1878.
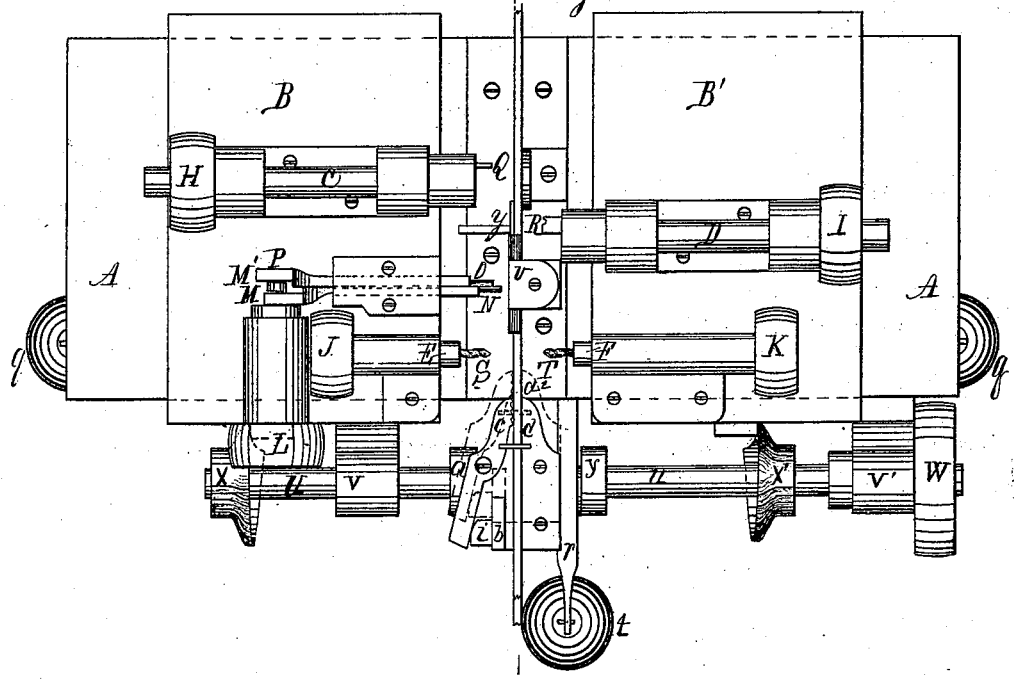
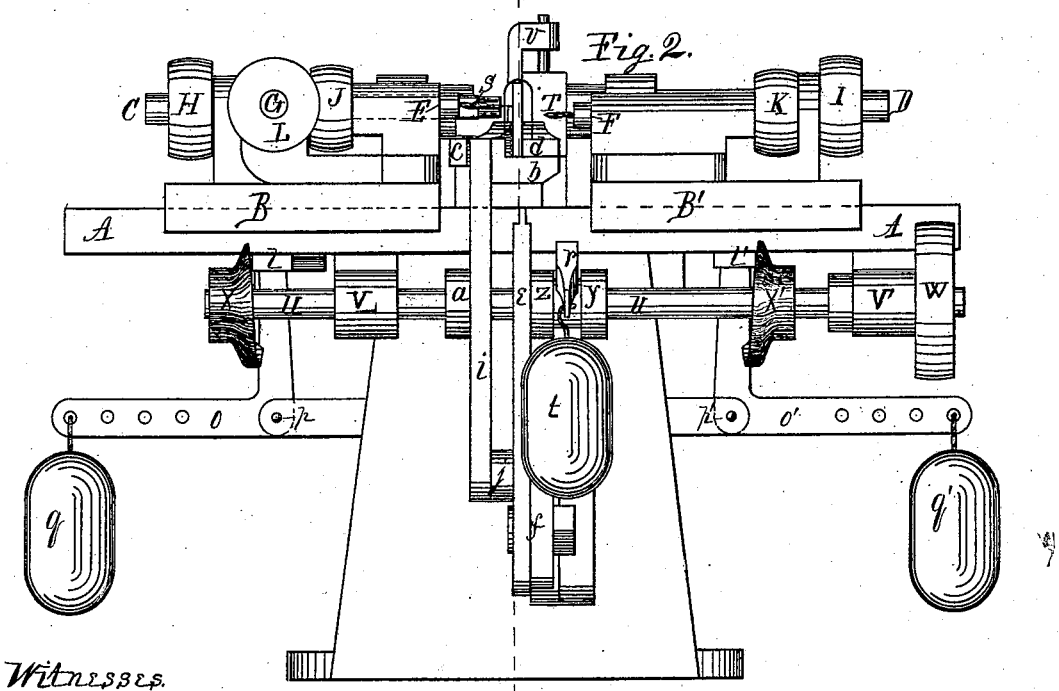

C. C. HILL.
Machine for Cutting Escutcheons.

No. 210,200. Patented Nov. 26, 1878.

Witnesses.
Jacob Behel
A. O. Behel

Inventor.
Christian C. Hill
Jacob Behel, Atty.

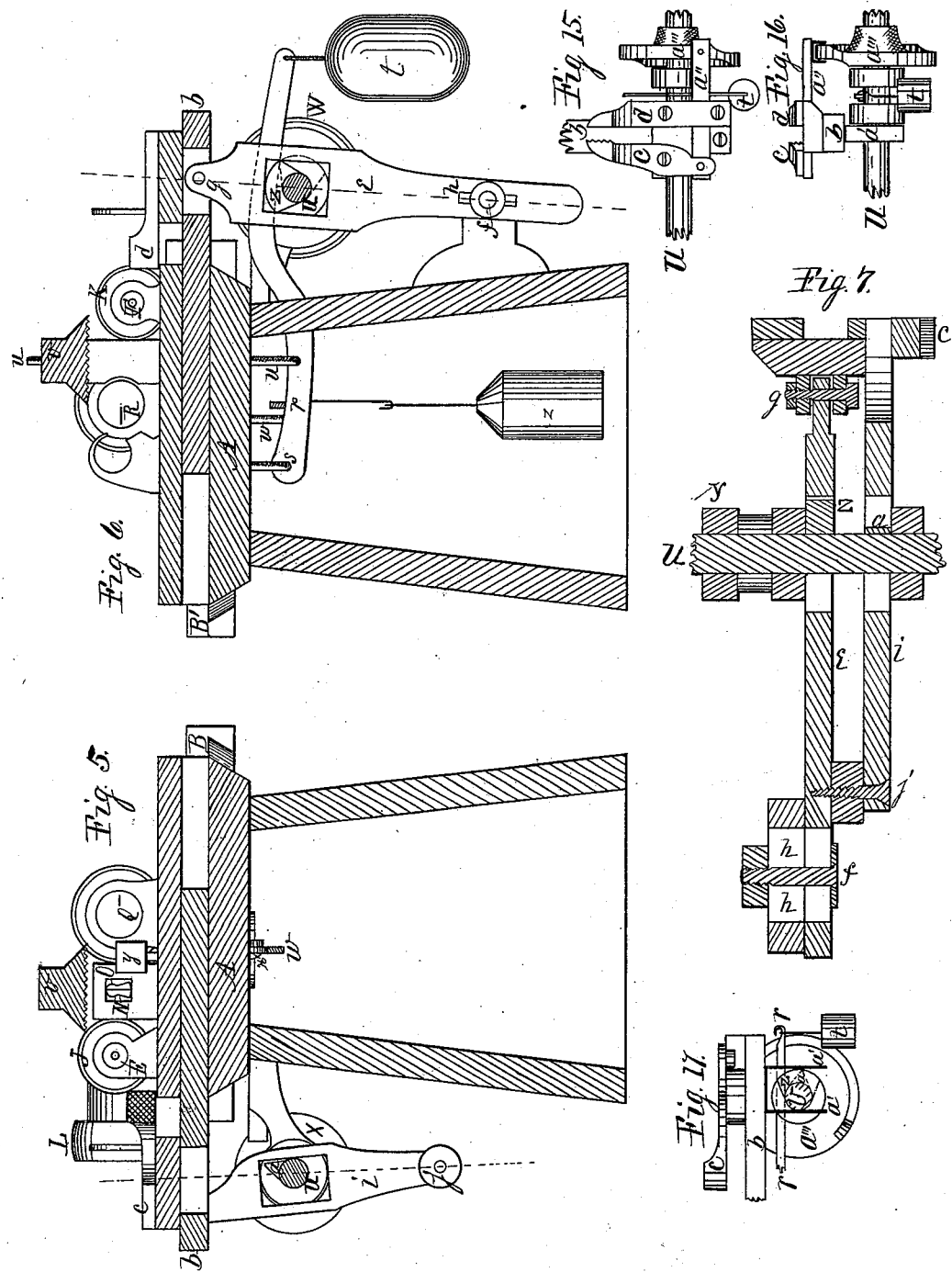

4 Sheets—Sheet 4.
C. C. HILL.
Machine for Cutting Escutcheons.
No. 210,200. Patented Nov. 26, 1878.
Fig. 8.
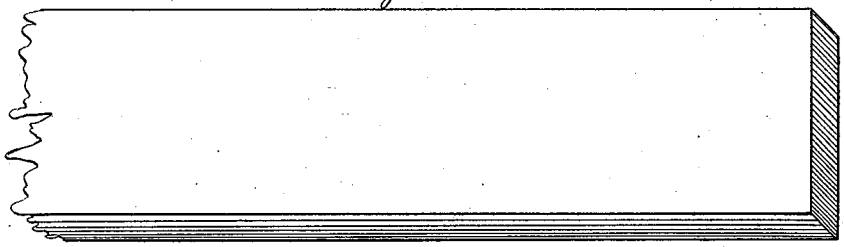
Fig. 9.
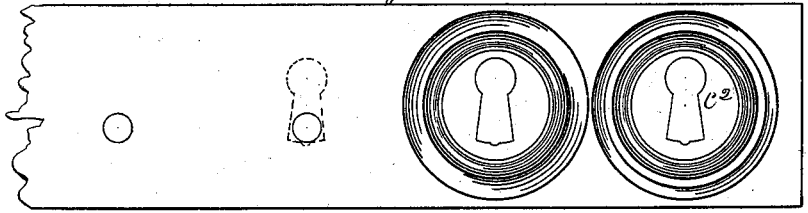
Fig. 10.
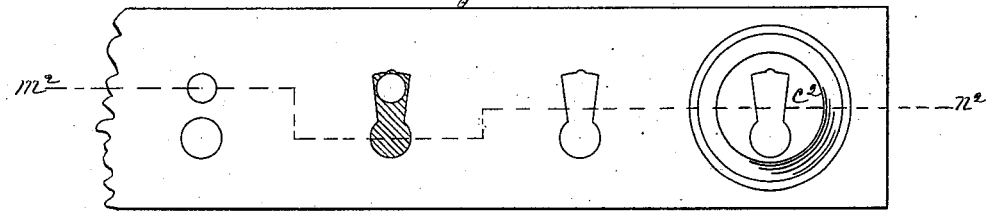
Fig. 11.
Fig. 12.   Fig. 13.   Fig. 14.
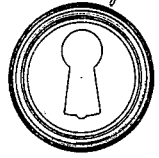  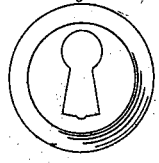
Witnesses.
Jacob Behel
A. O. Behel
Inventor.
Christian C. Hill.
Jacob Behel, Atty.

UNITED STATES PATENT OFFICE.

CHRISTIAN C. HILL, OF ROCKFORD, ILLINOIS.

IMPROVEMENT IN MACHINES FOR CUTTING ESCUTCHEONS.

Specification forming part of Letters Patent No. 210,200, dated November 26, 1878; application filed November 27, 1877.

*To all whom it may concern:*

Be it known that I, CHRISTIAN C. HILL, of Rockford, in the county of Winnebago and State of Illinois, have invented a new and useful Improvement in Machines for Manufacturing Key-Hole Escutcheons, and other analogous articles, and in the process of manufacturing such goods, which improvements are fully set forth in the following specification.

Heretofore the manufacture of wooden key-hole escutcheons has involved two or more operations—such as, first, cutting the face of the escutcheon; second, cutting the key-hole; third, cutting the rabbet on the back side of the escutcheon, and also cutting the escutcheon loose from the strip of wood. Each of these operations has necessitated the use of its respective machine and operator.

Now, as the above is a somewhat slow and expensive method of accomplishing the object in view, I have made the invention hereinafter described, in which the object gained is a method of manufacturing escutcheons, buttons, and articles of like nature automatically by feeding pieces of wood properly prepared into the machine.

By this process, which necessitates the use of but one machine, a more perfect escutcheon is produced than by previous inventions, and at a much less cost.

The following description applies to this machine in one peculiar capacity—that of manufacturing wooden key-hole escutcheons. By slightly altering the tools and motions it may be adapted to the manufacture of various articles, as buttons, rosettes, and the like.

Figure 3:
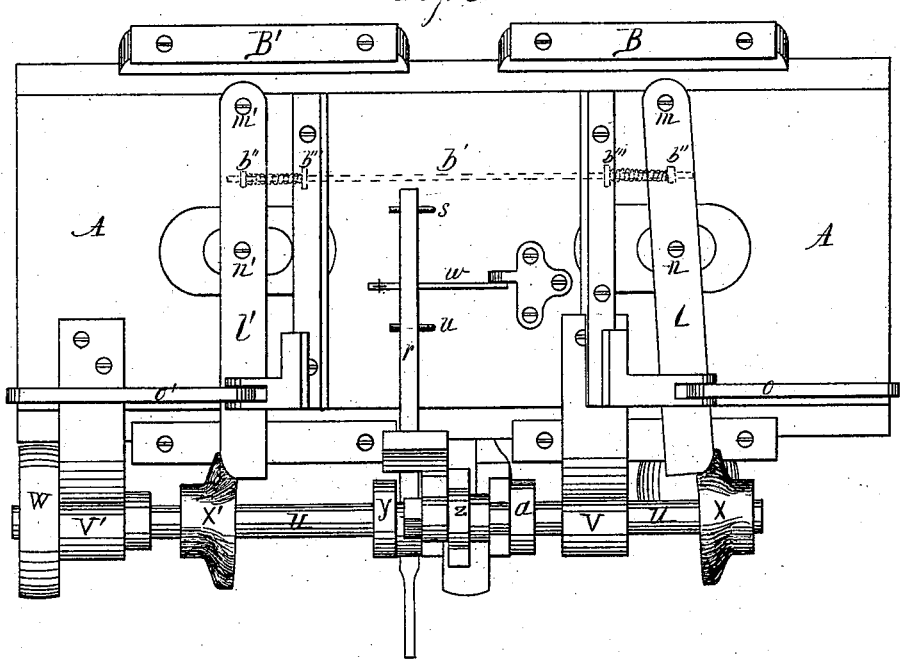
Figure 4:
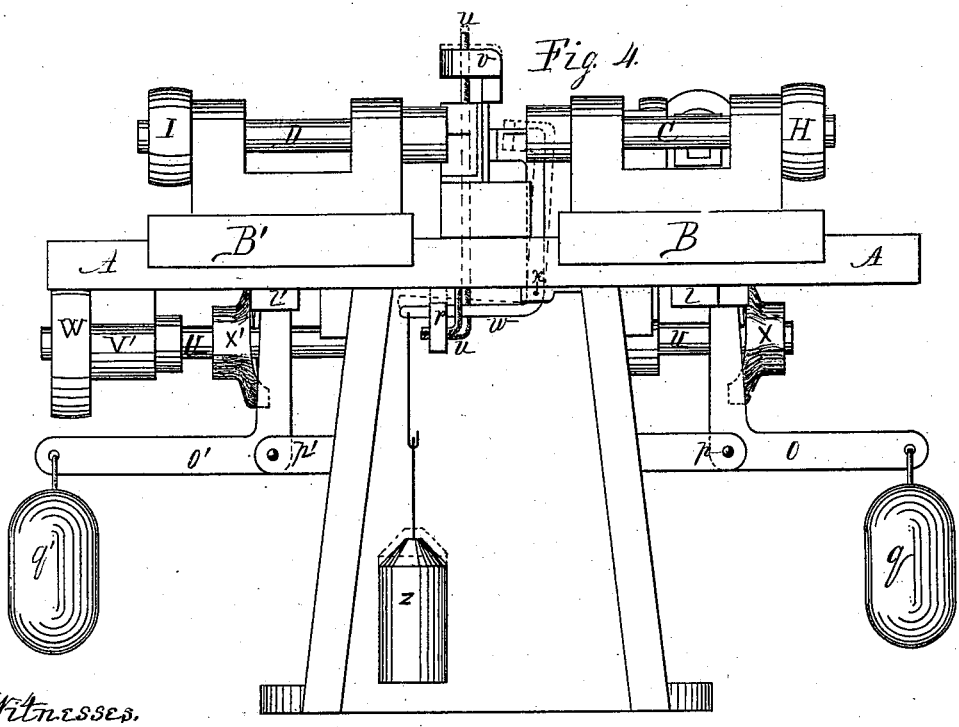

Figure 1 is a plan view of the machine embodying my invention. Fig. 2 is a front elevation of the same. Fig. 3 is a bottom view of the parts therein represented. Fig. 4 is a rear elevation, with portions of the supporting-base removed for the purpose of showing clearly the arrangement of weights and levers by means of which the timber is held while being operated upon. Figs. 5 and 6 represent central vertical cross-sections of the machine as obtained by passing a plane through Fig. 2 in the direction of the dotted line $d''$. Fig. 7 is a central vertical section of cams and levers composing the primary operating devices of the automatic feed. Fig. 8 represents the piece of wood from which the escutcheon is to be cut. This wood is of indefinite length, and made to conform in width and in thickness to the style of goods to be manufactured. Fig. 9 represents that side of the wood upon which the face of the escutcheon is cut, and shows the wood as left after four operations—first, boring; second, cutting the key-hole; third, turning the face; fourth, cutting the rabbet and cutting the escutcheon loose. Fig. 10 shows the back side of the wood, and represents the escutcheon as completed, but still occupying its position on the stick. Fig. 11 represents a vertical longitudinal section of Fig. 10 as obtained by passing a plane through the figure in the direction of the broken line extending from $n^2$ to $m^2$, and shows the wood in the condition in which it is left after the four operations. Fig. 12 shows face side of completed escutcheon. Fig. 13 shows the escutcheon as cut by a plane perpendicular to the face, so as to present a central section. Fig. 14 shows the back side of completed escutcheon.

A A in Fig. 1 shows the bed-plate or frame of the machine, supported on a suitable base. B B' are slides, so arranged that they are free to move in the direction of the length of the bed A A. On the slides B B' are arranged shafts C, D, E, F, and G. These shafts are supported in suitable bearings, which are secured to the slides B B'. On the shafts C, D, E, F, and G are secured respective pulleys H, I, J, K, and L. These five pulleys are driven by five bands. M M' are sliding bars, respectively provided at their free ends with chisels N and O, corresponding in size and form to perforation for required key-hole. These bars have a reciprocating motion, one advancing as the other recedes. This motion is imparted by cams or cranks located on the shaft G at the end P. The shafts C D are respectively provided with cutters Q R, for the purpose of cutting the wood to the form of the required escutcheon. The shafts E F are respectively provided with boring-tools S T, by means of which perforations are made in the wood preparatory to the cutting of the key-hole. U is a shaft supported in the bearings V and V', and operated by the pulley W. To this shaft are attached the cams X, X', $a$, Y, and Z. These cams give variable movement to the mechanism. The shaft U performs one revolution during the cutting of each escutcheon. *b* in Figs. 5 and 6 is a bar, supported in a suitable guide, and so arranged as to be free to slide across the bed A A in the direction of the width of the bed. To this bar are attached the movable jaw *c*, and the stationary jaw *d*. These jaws grasp the wood and carry it forward. *e* is a lever, pivoted to a projection on the base at *f*, and also to the bar *b* at *g*, Fig. 6. This lever is operated upon by the cam Z, which imparts to it an oscillatory movement from the center *f*. By slotting the lever and the projection and placing a movable stud or pin in the slot, provision is made for changing the distance of the center *f* from the operating-cam Z. This is shown at *h*, Fig. 6. The movement of this lever *e* imparts an alternate backward and forward motion to the bar *b*. *i* is a lever operated by the cam *a*. It is similar in attachment and movement to lever *e*, to which it is pivoted at *j*. Its purpose is to close the movable jaw *c*, its free end acting as a wedge between the end of jaw *c* and bar *b*. The jaw *c* is again opened by a spring or other suitable device. $l\,l'$, Fig. 3, are levers, pivoted to the bottom of the bedplate at $m\,m'$, and also pivoted at their respective centers $n\,n'$ to projections from the plates B and B'. These levers engage with the cams X X', from which they receive an oscillatory motion. The centers of this motion are at $m$ and $m'$. By means of these levers $l$ and $l'$ the plates B and B' are alternately moved to and from each other in a direction coinciding with the length of the bedplate. *o o* are bell-cranks, pivoted respectively at *p* and *p'* to projections on the base. These bell-cranks are so connected with levers $l$ and $l'$ that the weights $q$ and $q'$ have a tendency to draw the levers back toward the cams X and X'. *r* is a lever, hinged to the bottom of the bed-plate at *s*, Fig. 3, and having attached to its front end a weight, *t*. At *u* is shown a rod extending through the bedplate, hinged at its lower end to lever *r*, and having fixed to its upper end a presser-foot, *v*. This presser-foot, by means of rod *u*, lever *r*, and weight *t*, assists in holding the stick in position while being operated upon. The cam Y is so arranged upon the shaft U that it lifts the lever *r* once every revolution of the shaft U, holding it long enough to allow the feed to move the stick through one interval of space. *w* is a bell-crank, operated by lever *r*, and hinged to the bed-plate *x*, Fig. 4. A plate on its upper end (shown at *y*, Fig. 1) is made by means of the weight *z* to press against the stick and hold it sidewise. This bell-crank is lifted by lever *r*, which is itself lifted by cam Y.

Having thus described in full the machine embodied in my invention, I pass to the mode of operation and process of manufacture of the escutcheons, explaining separately the successive operations by which I arrive at the desired result.

The machine is set in motion. When the jaw *c* opens, the strip of wood is introduced between the jaws *c* and *d*. The cam *a* closes the jaw *c* and holds the stick. The cam *y* lifts the lever *r* to allow the stick to pass under the presser-foot. The cam Z then moves the lever *e* forward, thus moving the stick forward, as indicated by dotted line $a^2$, Fig. 1, through one interval. By an interval is meant the distance between the center of two consecutive escutcheons, and should be just sufficient to allow of cutting the escutcheon without unnecessary waste. The cam Y releases the lever *r*, thus allowing it to fall and secure the stick.

The cams X and X' engage with levers $l$ and $l'$, and thus move the slides B B' toward the strip of wood. The boring-tools S and T then pierce the stick. Meanwhile the jaw *c* opens, then recedes the distance of another interval and grasps the stick. When this is accomplished and the boring-tools have completed their work, the cams X and X' allow the slides B and B' to recede with their accompanying tools.

The preceding operations are repeated through each interval. When the stick is carried through the second interval, the holes made by the boring-tools are brought just opposite the chisels N O. The sliding forward of the plates B and B' being again repeated, the boring-tools pierce the stick for second escutcheon and the chisels cut to proper shape the key-hole of the first escutcheon, cutting preferably but partly through the wood and from the side designed for the back of the escutcheon $b^2$, Fig. 11.

The alternately-moving chisels operate to remove the material and form the key-hole with the expenditure of less power than is the case when a single hollow chisel is employed for such purpose. When one chisel has pierced the strip and has been withdrawn therefrom, the other chisel enters the strip, and, as the wood is not firmly held against lateral displacement, it is readily removed by the chisel without any tendency to clog and otherwise obstruct the progress of the work.

The continuance of this process through the third interval pierces the key-hole of the third escutcheon, cuts the key-hole of the second to proper shape, and cuts the face of the first by means of revolving cutter R, which cuts sufficiently deep to reach beyond the bottom of the hole cut from the opposite side by the chisels N O. Passing through the fourth interval, the key-hole of fourth escutcheon is pierced, the key-hole of the third is cut to proper shape, the face of the second is cut, and the first escutcheon is completed and cut loose from the stick of wood by means of the revolving tool Q, as shown at $c^2$, Figs. 9, 10, and 11.

By repetition of this process the operation may be continued at will. Each interval of such repetition produces a completed escutcheon.

In Figs. 15, 16, and 17 is represented a feeding device detached, which, in some minor respects, differs slightly from the one represented in the machine described in the foregoing specification. In these figures, 15 represents a plan view, 16 an elevation seen from the front side of the machine, and 17 an elevation as seen from the left-hand end of the machine.

In these several figures the shaft U, cams $c$ and $a$, lever $r$, weight $t$, sliding bar $b$, and jaws $c$ and $d$ are substantially the same as the parts in the above-described machine, and designated in the several figures referred to by similar letters of reference.

In this detached feeding device, at Fig. 17, $a'$ $a'$ represent depending arms secured at their upper ends to the sliding bar $b$. These depending arms are made to embrace the cam Z, which, in its revolutions, will act upon the depending arms to impart a forward-and-backward movement to the sliding bar $b$, which will carry with it the feeding-jaws $c$ and $d$ secured to its upper side, substantially in the same manner and for the same purpose as in the foregoing-described machine.

In the several Figs. 15, 16, and 17, $a''$ represents a transverse sliding bar, one end of which is pivoted to the rear end of the jaw $a$, and its other end is fitted to embrace the rim of the double-faced cam-wheel $a'''$, which is secured in an adjustable manner to the shaft U. This cam-wheel $a'''$ is of such form that in each revolution it will operate through the sliding bar $a''$ to open and close the jaws $c$ and $d$, to grasp and feed the stick to be operated upon into the machine, in every particular substantially in the same manner and for the same purpose as shown and described in the drawings and specification of the machine as above, which forms the subject-matter of the foregoing specification.

In Fig. 3, in the dotted lines, I have represented a rod or bar, $b'$, the ends of which are fitted to slide through eye-staples $b''$ secured to the levers $l$ $l'$. These rods are provided with collars $b'''$, and between the collars $b'''$ and the eye-staples $b''$ are surrounded by spiral springs, which operate against the eye-staples and force the levers outward against the cam-wheels X X'. This device may be employed instead of the bell-cranks $o$ $o'$ and the weights $q$ $q'$.

Having thus described in full the machine and process embodying my invention, what I claim, and desire to secure by Letters Patent, is—

1. The combination, substantially as described, of an automatic feeding device and a key-hole or mortise-cutting device, whereby the stick from which the escutcheons are to be cut is alternately fed forward and operated upon.

2. The combination, substantially as described, of an automatic intermittent feeding device and a face-cutting device, whereby the stick from which escutcheons are to be cut can be alternately fed forward and operated upon.

3. The combination, substantially as described, of a key-hole or mortise-cutting device cutting a hole in the stick and of a face-cutting device cutting down across the hole subsequent to the cutting of key-hole, whereby a smooth unbroken edge is secured to the face of the key-hole or mortise.

4. The combination, with cutting-tools for forming the opposite faces of an escutcheon and boring-tools for partially forming the key-holes, of the automatic reciprocating chisels, cutting alternately the opposite sides of a key-hole, and means for gradually advancing the chisels while in operation, substantially as set forth.

5. In an escutcheon-machine, the shafts C and D, substantially as described, provided with proper cutting-tools, and so arranged that they move in the direction of their length toward the wood and operate on it from opposite directions, one forming the face of one escutcheon and the other forming the back of another escutcheon, which escutcheon it also cuts loose.

6. The combination, with shafts E F, mounted on sliding tables, and means for actuating said shafts, of boring-tools attached to the adjacent ends of said shafts, the parts being arranged substantially as set forth, whereby the stick will be pierced in opposite directions and in the same vertical plane, substantially as set forth.

7. In a machine for manufacturing escutcheons, the combination, with tools for forming the escutcheon, of the grasping-jaw $c$ and fixed jaw $a$, substantially as set forth.

8. The combination, substantially as described, of levers $e$ and $i$, cams Z and $a$, bar $b$, and jaws $c$ and $d$.

9. In the manufacture of escutcheons, the process, substantially as described, of operating on the wood in the following manner: cutting the key-hole from one side of the stick and forming the face of the escutcheon on its opposite side, to produce an escutcheon with key-hole having solid side walls and edges on both sides clear, sharp, and well defined, then shaping the back of the escutcheon and cutting it from the stick, as herein described.

10. The herein-described method of making escutcheons, rosettes, &c., from continuous strips of material moved endwise in regular succession to one revolving cutter, which forms one side, and to another revolving cutter, which forms the other side, and also cuts the completed disk from the strip, substantially as described and set forth.

11. The combination, with cutting-tools for forming the opposite faces of an escutcheon and chisels for cutting the key-hole in the same, of two independent boring-tools arranged to cut separate holes in the stick in the same vertical plane, substantially as set forth.

CHRISTIAN C. HILL.

Witnesses:
A. O. BEHEL,
JAMES FERGUSON.